Oct. 28, 1969     R. J. STOTTS     3,474,801
AUTOMATIC CAR WASH
Filed July 28, 1967     5 Sheets-Sheet 1
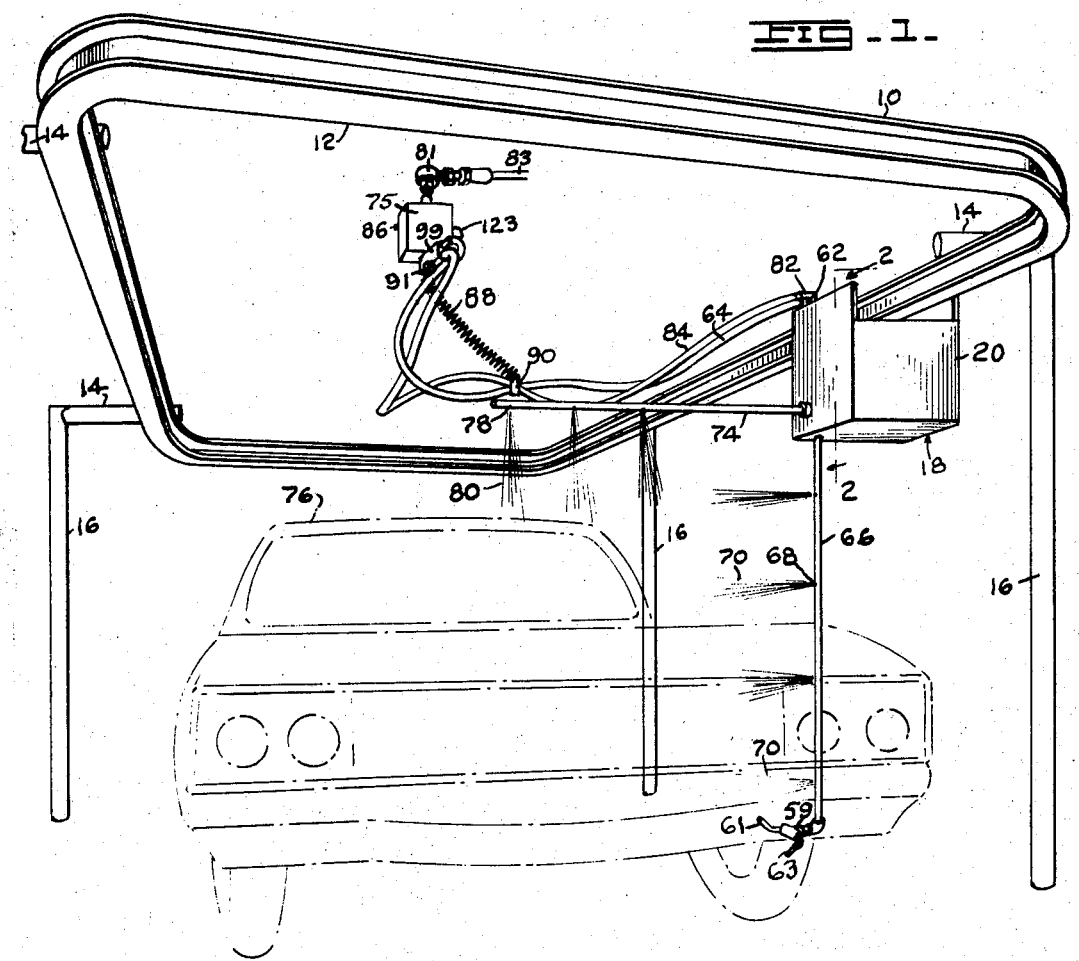
INVENTOR
ROBERT J. STOTTS
BY Homer R. Montague
ATTORNEY

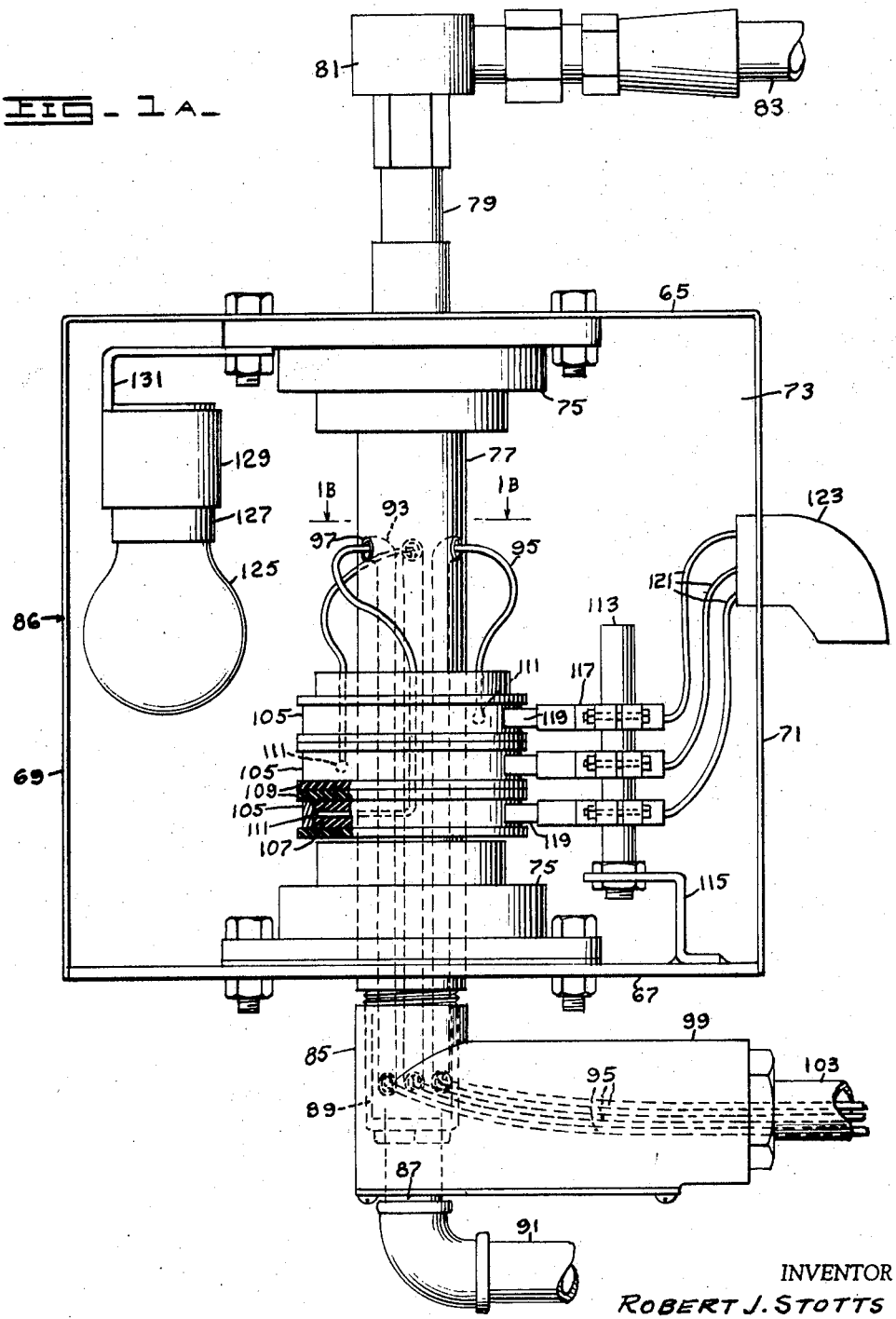

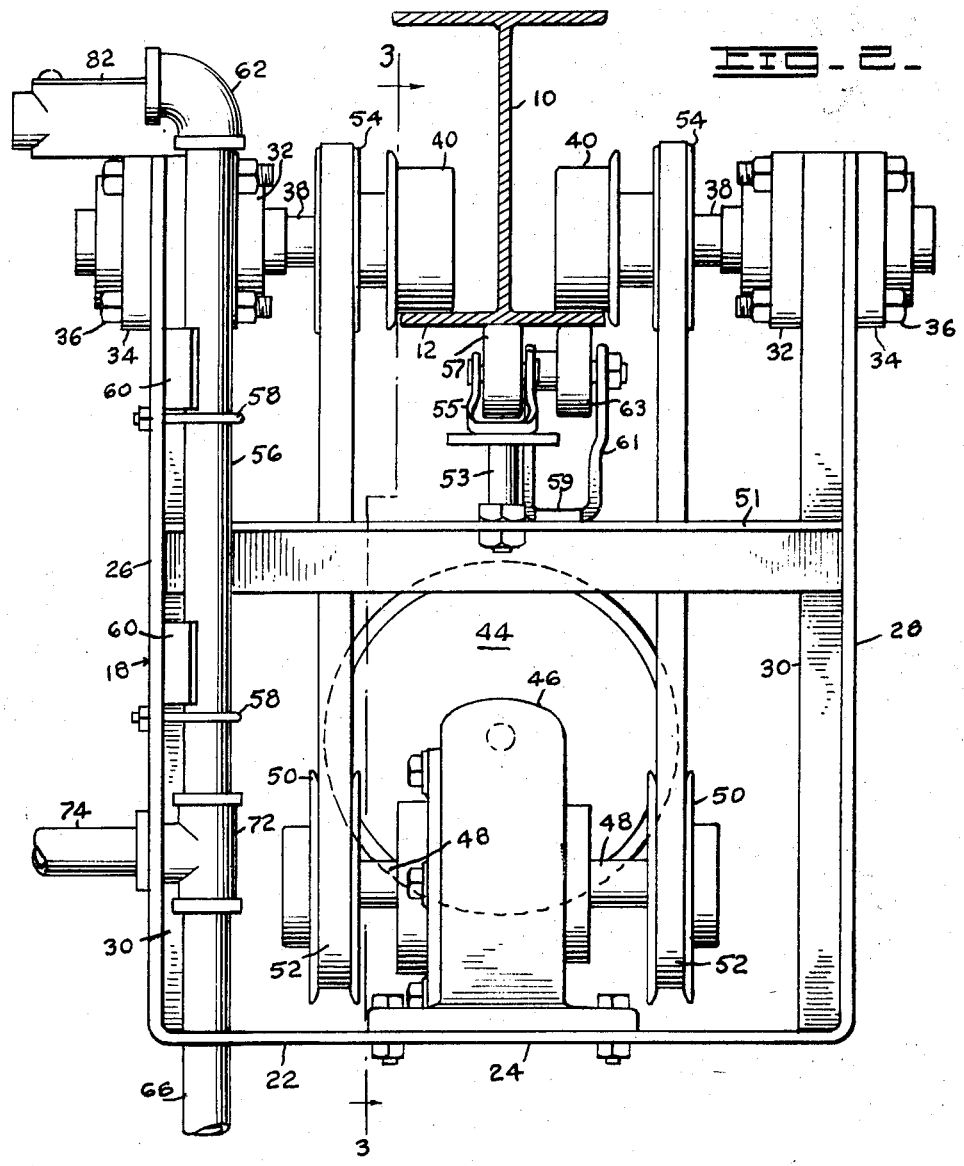

Oct. 28, 1969     R. J. STOTTS     3,474,801
AUTOMATIC CAR WASH

Filed July 28, 1967     5 Sheets-Sheet 4

INVENTOR
ROBERT J. STOTTS

BY *Homer L. Montague*

ATTORNEY

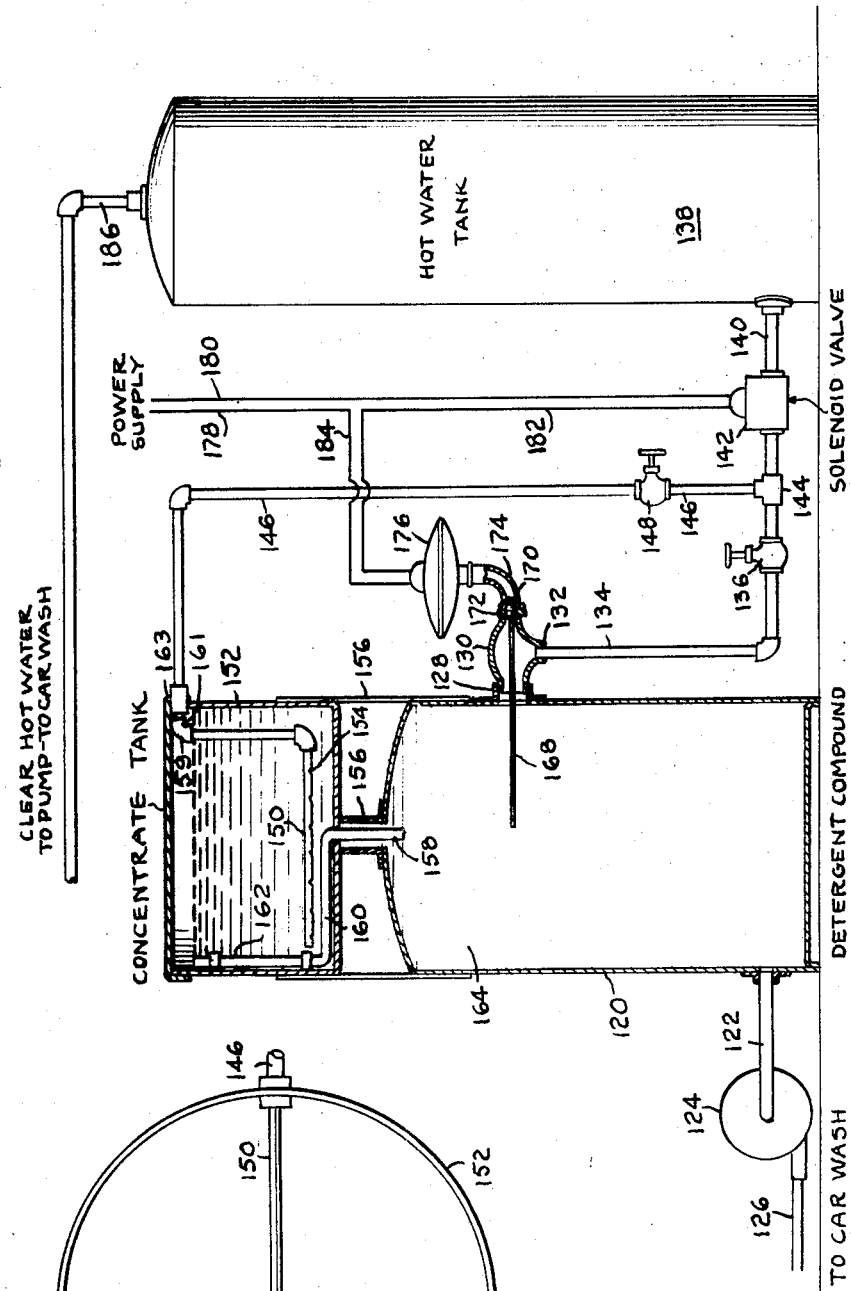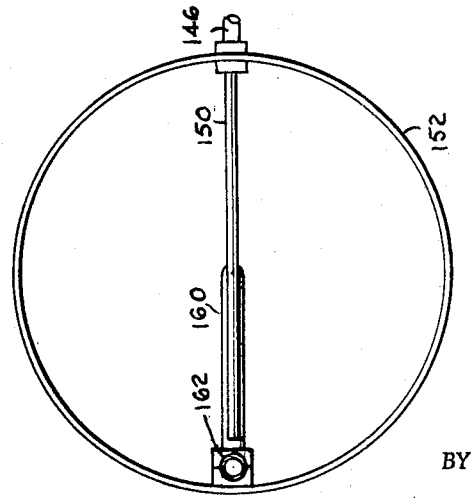

though which
washing and rinsing liquid is supplied to the pipe 56.

United States Patent Office 3,474,801
Patented Oct. 28, 1969

3,474,801
AUTOMATIC CAR WASH
Robert J. Stotts, P.O. Box 12582,
Oklahoma City, Okla. 73112
Filed July 28, 1967, Ser. No. 656,892
Int. Cl. B60s 3/04; B08b 3/02
U.S. Cl. 134—123                                          4 Claims

ABSTRACT OF THE DISCLOSURE

A self-propelled trolley travels around a closed overhead track and first sprays hot detergent-containing water on the top and sides of the car, for several circuits or revolutions, followed by the spraying of clear hot rinse water on and against the car for several more circuits, the installation being provided with an automatic system for maintaining a body of properly concentrated detergent-containing water in a suitable container to be supplied to the sprayer pipes. Novel fluid and electric swivels to supply the trolley are included.

BACKGROUND OF THE INVENTION

The invention has application in the field wherein a motor vehicle is driven, usually through a building, to a position beneath an overhead closed track in order to be cleaned by spraying the top, sides, front and back of the vehicle.

In the prior art it has been proposed to drive around the overhead track a trolley propelled by endless chains driven from a suitable source, to spray the car with a detergent-containing water to free it from dust, dirt and road grime, followed by the flushing of the car with clear water. The use of chains is disadvantageous because of the cost of installation and also because of the cost of maintenance. Moreover, if any obstacles should be arranged in the path of travel in any of the parts supported by the track, the positive driving of the trolley would result in breakage of one or more of the parts. These difficulties are solved with the present construction wherein the trolley is self-propelled and is driven through traction on supporting rails, rather than by a positive drive.

SUMMARY OF THE INVENTION

The invention provides an overhead closed track preferably of I-beam section, the lower flange of which is engaged by wheels carried by the trolley, such wheels being driven by a motor in the trolley to move it around the overhead track. Such propulsion of the trolley is through the traction of the wheels on the supporting flange referred to. This eliminates the awkward mountings and the expense involved in the use of endless chains. Moreover, the apparatus is much quieter in operation and the drive is not positive so that any obstacle in the path of travel of the apparatus will merely stop movement of the trolley as the wheels turn on the supporting flange without moving therealong. Electric current for the motor is supplied through a flexible cable and water is supplied through a flexible hose, both leading from a central overhead casing to which the connections are swivelly mounted to turn as the trolley travels around the track. The flexible hose and electrical conduit are supported by a tension spring as the trolley moves around the track, spraying detergent-containing hot water over the top of the vehicle, against the sides and wheels and around the front and rear of the vehicle, after which suitable means, forming no part of the present invention, switches to supply clear hot water to the vehicle spray pipes and thus to the vehicle to rinse the detergent therefrom, preferably through three more circuits of travel of the trolley around the vehicle.

BRIEF DESCRIPTION OF THE DRAWING

FIGURE 1 is a perspective view of the apparatus in operation spraying a motor vehicle, the latter being shown in broken lines;

FIGURE 1A is a face view of the overhead casing and the swivel mountings for the fluid ducts and wiring connections, the cover of the casing being removed and parts being shown in section;

FIGURE 1B is a section taken on line 1B–1B of FIGURE 1A;

FIGURE 2 is an enlarged sectional view taken substantially on line 2—2 of FIGURE 1, the casing of the trolley being omitted;

FIGURE 4 is a side elevation of the washing liquid supply system, the detergent compound tank and associated elements being shown in section; and FIGURE 5 is an enlarged plan view of the concentrate tank.

DESCRIPTION OF THE PREFERRED EMBODIMENT

Figure 3:
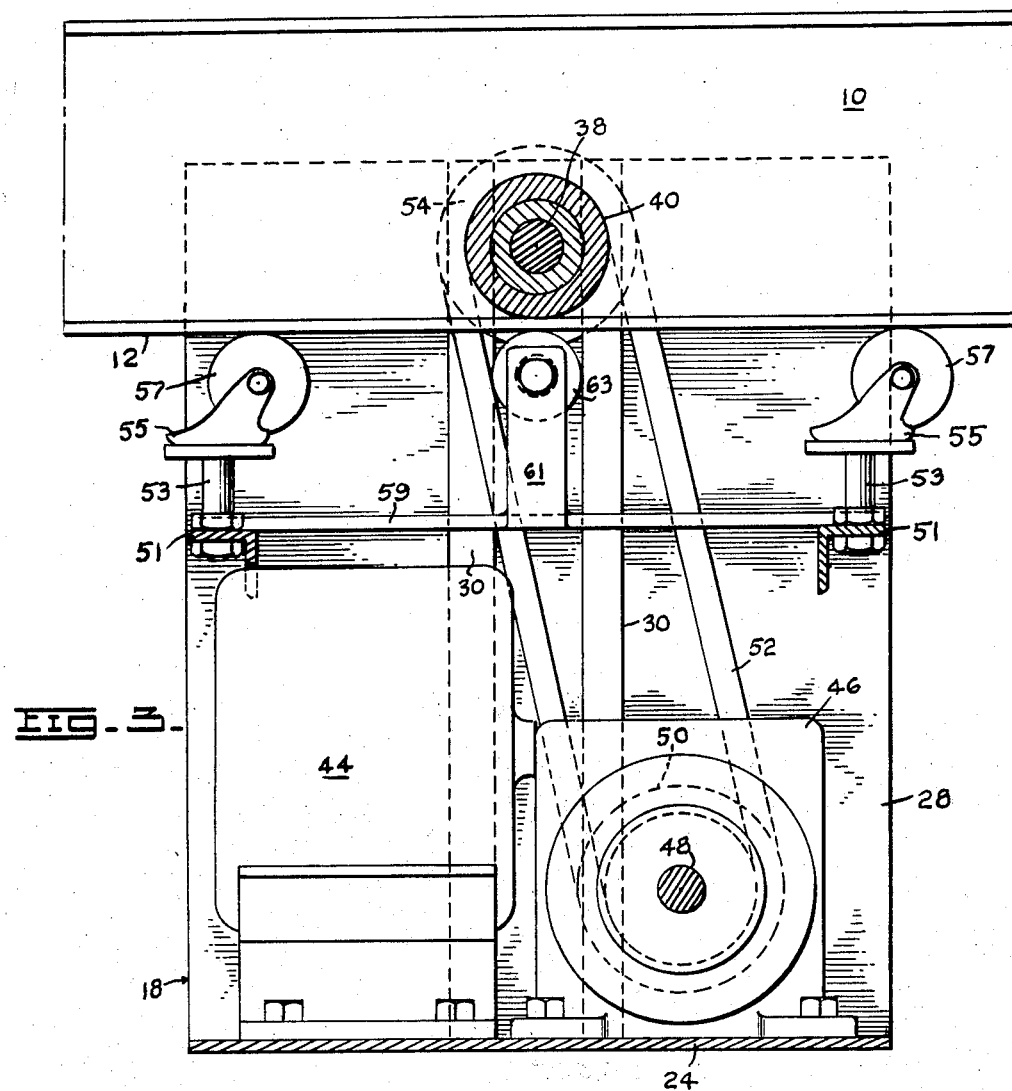
FIGURE 3 is a vertical section on line 3—3 of FIGURE 2.

Referring to FIGURE 1, the numeral 10 designates an overhead trackway preferably in the form of an I-beam having a lower flange 12, the upper surfaces of the opposite sides of which form a trolley-supporting trackway as described below. The trackway is in the form of a closed parallelogram having rounded corners to facilitate the travel therearound of the trolley to be described. Outtrigger supporting arms 14 are welded to the face of the upper flange of the trackway and are welded at their outer ends to supporting posts 16, or the track may be dependently supported from the building ceiling or beam structure.

A trolley indicated as a whole by the numeral 18 is adapted to travel around the trackway 10. This trolley is provided with a surrounding casing 20 omitted from FIGURES 2 and 3. Referring to the latter figures, the numeral 22 indicates as a whole the U-shaped body of the trolley having a base portion 24 and side walls 26 and 28. A pair of closed column supports 30 are welded against the inner faces of each of the side walls 26 and 28, the supports of each wall being spaced apart as shown in FIGURE 3.

At each side of the trolley body and centrally at the top of each wall is arranged a pair of bearings 32 and 34, the former of which are arranged against the adjacent support columns 30, while the bearings 34 are arranged against the outer face of the walls 26 and 28. The bearings of each pair are connected by bolts 36. The bearings of each pair are thus spaced substantially from each other to effectively support a pair of stub shafts 38, each of which carries at its inner end a flanged wheel 40 engaging the upper face of the lower beam flange 12. The columns 30 serve not only to space the bearings 32 and 34 of each pair but also to render extremely rigid the side walls 26 and 28.

Wheels 40 are adapted to be driven by an electric motor 44, the drive shaft of which extends into a reducing gear unit 46 having an output shaft 48 extending from opposite sides of the reduction unit. Each end of the shaft 48 carries a pulley 50 around which passes an endless belt 52. This belt also extends around pulleys 54 fixed to the wheels 40. Thus the wheels 40 will be driven at a relatively slow speed to travel around the trackway 10.

A pipe 56 (FIGURE 2) is fixed by U-bolts 58 against saddles 60 welded to the wall 26. At its upper end, the pipe 56 is provided with an elbow 62 connected to one end of a flexible hose 64 (FIGURE 1) through which washing and rinsing liquid is supplied to the pipe 56.

The pipe 56 extends downwardly below the trolley as at 66 and is provided with spray nozzles 68 for projecting sprays 70 laterally inwardly against the vehicle. The lower end of the pipe 66 is provided with a lateral extension 59 leading to two lower nozzles 61 and 63. The nozzle 61 inclines upwardly towards its free end to project the spray against the wheels of the vehicle and beneath the fenders, while the nozzle 63 inclines downwardly to effectively wash the lower parts of the vehicle wheels. Within the trolley, the pipe 56 is provided with a T 72 from which extends a horizontal pipe 74 (FIGURE 1) arranged above the top of the vehicle shown in broken lines in FIGURE 1 and indicated by the numeral 76. The pipe 74 is provided with spray nozzle openings 78 for projecting the sprays 80 against the top portions of the vehicle.

A pair of transverse bars preferably of angle section 51 extend across the trolley and are welded at their ends to the walls 26 and 28. Each bar 51 carries an upstanding post 53 on which is mounted a caster 55 including a wheel 57 engaging against the bottom of the trackway flange 12. As shown at FIGURE 3, the wheels 51 are arranged substantially and equidistantly spaced on opposite sides of the vertical plane of the common axis of the wheels 40. In other words, the casters are arranged centrally of the width of the trackway (FIGURE 2) and spaced longitudinally along the trackway to stabilize the trolley and prevent its rocking longitudinally of the trackway.

A rigid connecting bar 59 has its ends resting upon and welded to the bars 51 and intermediate its ends carries upstanding ears 61 rotatably supporting a stabilizing wheel 63. As shown in FIGURE 3, the wheel 63 is arranged with its axis parallel to and in the vertical plane of the common axis of the wheels 40. Referring to FIGURE 2, it will be noted that the wheel 63 engages the bottom of the flange 12 near the side of the trackway remote from the pipes 66 and 74. These pipes unbalance the trolley and tend to cause it to rock clockwise in FIGURE 2 transversely of the trackway. The wheel 63 stabilizes lateral movement of the trolley and prevents it from rocking, in the manner stated.

Electrical connection to the motor 44 is provided through a condulet box 82 (FIGURE 2) from which leads a flexible conduit 84 (FIGURE 1). The hose 64 and conduit 84 lead to an overhead casing 86 shown in FIGURE 1A and described below. A spring 88 is connected at one end to the casing 86 and at its other end to a band 90 surrounding the hose 64 and conduit 84 to support the latter against sagging when the trolley is moving along the side runs of the trackway in which positions the trolley is closer to the center point of the trackway.

Referring to FIGURE 1A, the casing 86 is provided with top and bottom walls 65 and 67, side walls 69 and 71, back wall 73 and front wall 75 (FIGURE 1). The top and bottom walls 65 and 67 carry bearings 75 supporting a vertical tubular member 77 which is adapted to rotate in accordance with movement of the trolley 18 around the trackway 10. The casing 86 is fixed against rotating movement in any suitable manner.

The upper end of the tubular member 77 is supplied with washing liquid through a tube 79 connected to a suitable type of commercially available swivel 81 through which fluid is supplied through a pipe 83. The lower end of the tubular member 77 is provided with a fitting 85 to the lower end of which is connected a pipe 87 leading upwardly into the lower end of a fitting 89 connected at its upper end to the lower end of the tubular member 77. The lower end of the pipe 87 leads to a short pipe 91 ultimately connected to the hose 64 (FIGURE 1) to supply fluid to the pipe 56 (FIGURE 2) and associated spray nozzles.

Within the tubular member 77 are arranged three metal tubes 93 into which extend wires 95. The upper and lower extremities of the tubes 93 are turned to extend into openings 97 in the tubular member 77 and fitting 89, respectively, and the extremities of the tubes 93 are sealed in engagement with the openings 97, for example, by silver solder, so that fluid cannot enter the tubes.

The wires 95 project downwardly through the tubes 93 and outwardly through a condulet 99 as at 101, the condulet forming a part of the fitting 85. The wires 95 extend through a pipe 103 for a couple of feet and thence to conduit 84 leading to the condulet 82 of the trolley.

Three slip rings 105 surround the tubular member 77 and are insulated therefrom by inner insulating rings 107 and have their edges engaged with insulating rings 109. Each of the wires 95 has its free end soldered to one of the slip rings 105 as at 111.

A post 113 is fixed to the bottom wall 67 by a bracket 115 and has clamped thereto three members 117 each carrying a brush 119 conductively engaging one of the slip rings 105. Three wires 121 are connected to the respective members 117 and extend into the casing 86 from a suitable source through a condulet or the like 123. Two of these wires are from a 110 volt single phase source. The other wire 121 is grounded, preferably at the trolley 18 through the swivel.

An electric light bulb 125 is preferably mounted in the casing 86 to maintain a sufficient degree of heat in the casing and its connected pipes to prevent water from freezing. The socket 127 for the light bulb may be supported within a sleeve 129 carried by a bracket 131.

The concentrate supplying and controlling means are shown in FIGURES 4 and 5. A detergent compound tank 120 is adapted to supply detergent-containing hot water through a pipe 122 to a pump 124 having an outlet pipe 126 for supplying water from pipe 122 to the pipe 83. Hot water is supplied to the tank 120 through a branch 128 of a T 130, a second branch 132 of which is connected to one end of a pipe 134 extending from a normally open manually controllable valve 136. Hot water is supplied from a storage tank 138 to the pipe 134 through a pipe line 140 leading through a solenoid control valve 142 and through the run of a T 144. The branch of this T is connected to a pipe line 146 leading through a normally-open manually controllable valve 148 to a pipe 150 arranged horizontally within a concentrate tank 152, the pipe 150 being provided in the bottom thereof with spray openings 154. The concentrate tank 152 is supported above the tank 120 as at 156. A pipe 158 projects into the top of the tank 120, then along the tank 152 near the bottom thereof as at 160, thence upwardly as at 162 adjacent the wall of the tank 152 to a point near the top thereof, the tank normally being closed by a cover 163. The pipe 146 extends through the tank 152 above the level of the concentrate therein, and includes pipe and elbow elements as needed, including an elbow 159, vented at 161 to prevent creation of a vacuum in the concentrate tank.

A body of detergent-containing hot water 164 is maintained in the tank 120 to be pumped through the pump 124 to the trolley and to the spray pipes 66 and 74 during the car-washing operation. Means are provided for replenishing the supply of hot water and detergent in the tank 120 when the level of the liquid therein drops to a predetermined point. A level-sensing tube 168 projects through the branch 128 of the T 130 into tank 120 and is anchored as at 170 in the third branch 172 of the T 130 and in the adjacent end of a pipe 174 leading to an automatic pressure switch 176. The hydrostatic head pressure in tube 168, when tank 120 is full enough, maintains the switch 176 open. When the level of the cleaning compound in 120 drops below a desired level, the pressure change will permit the switch 176 to close.

Power supply lines are indicated by the numerals 178 and 180, the latter of which leads to the solenoid of valve 142. Such solenoid is connected in series with the switch elements of the switch 176 through wires 182 and 184, the latter of which leads to the supply line 178. When the switch 176 closes, the solenoid of valve 142 is energized and hot water will be supplied from the tank 138 through the pipe lines 140 and 134 to the tank 120. At the same time, hot water will be supplied through the pipe line 146 to the pipe 150. When such electrical elements of the system are not in operation, the operator will place highly soluble powdered detergent in the bottom of the tank 152 in a measured quantity. The valves 136 and 148 are so manually adjusted as to supply the proper percentage of water to each of the tanks 120 and 152, the hot water supplied to the latter tank dissolving the detergent compound to flow downwardly through the pipes 162, 160, 158 into the tank 120. Aside from the manual supplying of powdered detergent compound to the tank 152, the system operates automatically to maintain detergent solution in the tank 120 in proper strength and quantity at all times.

The tank 138 also is connected to one end of a pipe 186, the other end of which leads to an automatically controlled pump which operates after a car has been sprayed with detergent compound to a predetermined extent and such compound is cut off. The detergent compound is preferably supplied to the spray pipes 66 and 74 during three complete circuits of the trolley around trackway 10. After the detergent compound is cut off from the spray pipes, clear hot water from pipe 186 is pumped through hose 64 to the spray pipes to spray the vehicle with clear hot water during two or three complete circuits of the trolley around the trackway, and the trolley automatically stops in one side run of the trackway, out of the way of vehicle travel, under control of a switch operated by the trolley motion, and which switch also controls the cycling of the electrical control mechanism. The pressure of the detergent spray cleans the vehicle to loosen or remove all dust, dirt, etc., from the vehicle whereupon the car is thoroughly rinsed to remove all the detergent compound therefrom.

Other elements of this system, which may be conventional, control the timing of the supplying of detergent compound and hot water to the surfaces of the car during automatically counted rotations of the trolley. Such mechanism is preferably coin-controlled, and the control mechanism may be further controlled according to the proper placing of the vehicle beneath the trackway. For example, means is preferably provided for indicating to the driver of the vehicle when he has moved forward to the proper position beneath the trackway. Other means, also forming no part of the present invention, will prevent the coin control mechanism from initiating the operation of the system if the vehicle has not been moved far enough forwardly (or too far) to be properly positioned beneath the trackway.

What is claimed is:

1. A motor vehicle washing apparatus comprising an overhead closed track of beam section having outstanding horizontal flanges, a self-propelled trolley mounted for movement around said track and having driving wheels in driving engagement with said flanges and a motor and power transmission means between said motor and wheels, said driving wheels being rotatably supported by said trolley on a horizontal axis, stabilizing wheels carried by said trolley and spaced apart longitudinally of said track on opposite sides of a vertical axis passing through the axis of rotation of said driving wheels, spray pipes carried at one side of said trolley for spraying washing liquid vertically downwardly and laterally aagainst the vehicle, a supply pipe on said trolley communicating with said spray pipes, a swivelled casing arranged above said track substantially centrally thereof, a flexible hose connected between said casing and said supply pipe to supply washing liquid to the latter and thus to said spray pipes as said trolley travels around said track, and a flexible conduit connected at one end to said casing and at its other end to said trolley to supply current to said motor; and a wheel carried by said trolley and engaging the bottom of the trackway flange opposite said first named side of said trolley and having its axis substantially beneath the axis of said driving wheels.

2. Apparatus according to claim 1 in which each of said driving wheels is provided with a shaft, and a substantially spaced pair of bearings for each shaft is carried by the adjacent side of the trolley.

3. Apparatus according to claim 1 wherein said trolley is provided with a U-shaped body, each pair of bearings being fixed with respect to an arm of said U-shaped body.

4. A motor vehicle washing apparatus comprising an overhead closed track, a trolley mounted for movement around said track and provided with a motor and traction wheels driven by said motor and engaging said track to propel the trolley, spray pipes carried by said trolley for spraying washing liquid vertically downwardly and laterally against the vehicle, a liquid supply pipe arranged above said track with its axis vertical, a liquid supply conduit, a swivel connecting said supply conduit to said supply pipe so that the latter may rotate on its axis, a flexible hose connecting the lower end of said supply pipe to said spray pipes, slip rings surrounding and carried by said supply pipe, tubes in said supply pipe and occupying only a portion of its cross-sectional area to provide for the flow of liquid through the supply pipe around said tubes, said tubes projecting at their ends radially through the supply pipe in sealed engagement therewith, wire connected to said slip rings and thence passing through said tubes and a flexible conduit to said motor, stationary brushes engaging said slip rings, and power supply wries connected to said brushes.

References Cited

UNITED STATES PATENTS

| 1,756,066 | 4/1930 | Pineles. | |
| 2,382,194 | 8/1945 | Wood. | |
| 2,896,857 | 7/1959 | Tompkins | 134—123 XR |
| 3,167,797 | 2/1965 | Hergonson | 134—123 XR |
| 3,208,088 | 9/1965 | Sulzberger et al. | 134—123 XR |
| 3,265,087 | 8/1966 | Livingston | 239—185 XR |
| 3,339,563 | 9/1967 | Ordonez | 134—181 XR |

FOREIGN PATENTS 375,182   6/1932   Great Britain.

ROBERT L. BLEUTGE, Primary Examiner

U.S. Cl. X.R.

134—181